United States Patent
Masters et al.

(10) Patent No.: US 7,292,774 B1
(45) Date of Patent: Nov. 6, 2007

(54) SYSTEM AND METHOD FOR CREATING AND DISPLAYING A PREFERENCE BASED MENU FOR A VIEWING SESSION

(75) Inventors: Bradley S. Masters, Mission Viejo, CA (US); William P. Price, Fountain Valley, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 1147 days.

(21) Appl. No.: 09/671,761

(22) Filed: Sep. 26, 2000

(51) Int. Cl.
*H04N 5/91* (2006.01)
(52) U.S. Cl. .......................... 386/83; 386/95
(58) Field of Classification Search ............... 725/46, 725/47, 58, 38, 39, 55, 61, 153; 345/716, 345/719; 386/83, 46, 95
See application file for complete search history.

(56) References Cited

U.S. PATENT DOCUMENTS

| | | | |
|---|---|---|---|
| 5,583,560 A | 12/1996 | Florin et al. ................... 348/7 |
| 5,758,259 A * | 5/1998 | Lawler ......................... 725/45 |
| 5,850,218 A * | 12/1998 | LaJoie et al. .................. 725/45 |
| 5,943,467 A | 8/1999 | Beyers et al. |
| 5,949,954 A | 9/1999 | Young et al. |
| 5,956,455 A | 9/1999 | Hennig |
| 5,977,964 A | 11/1999 | Williams et al. .............. 345/27 |
| 6,091,884 A | 7/2000 | Yuen et al. |
| 6,182,287 B1 | 1/2001 | Schneidewend et al. ...... 725/48 |
| 6,240,240 B1 * | 5/2001 | Nagano et al. ............... 386/83 |
| 6,292,624 B1 * | 9/2001 | Saib et al. .................... 386/83 |
| 6,449,767 B1 * | 9/2002 | Krapf et al. ................. 725/110 |
| 6,518,986 B1 * | 2/2003 | Mugura ...................... 715/810 |

(Continued)

FOREIGN PATENT DOCUMENTS

WO    WO 00/46986 A    8/2000

OTHER PUBLICATIONS

John B. Casey et al., *Digital Television and the PC*, Hauppage Computer Works, Inc., Nov. 1998, 12 pages.

(Continued)

*Primary Examiner*—Huy Nguyen
(74) *Attorney, Agent, or Firm*—Knobbe, Martens, Olson & Bear

(57) ABSTRACT

A video system has an input port to receive display contents including a plurality of broadcast display contents and has an output port to couple to a video display. Further, the system includes a preference engine, a storage device and a management module. The preference engine is coupled to the input port and tracks viewer selections of the broadcast display contents to create a viewer profile. The storage device is coupled to the input port, the output port and the preference engine, and records a first plurality of display contents according to the viewer profile and a second plurality of display contents upon a viewer selecting the display contents for recording. The management module is coupled to the preference engine and the storage device, and defines a third plurality of display contents based upon the available broadcast display contents for a viewing session and based upon the viewer profile. Further, the management module creates a menu of viewing choices comprising at least one of the first plurality of display contents, the second plurality of display contents and the third plurality of display contents. The menu is displayable on the video display from which a viewer can select a sequence of display contents for the viewing session.

16 Claims, 10 Drawing Sheets

U.S. PATENT DOCUMENTS

| | | | |
|---|---|---|---|
| 6,664,984 B2* | 12/2003 | Schlarb et al. | 715/826 |
| 6,721,954 B1* | 4/2004 | Nickum | 725/46 |
| 2002/0054068 A1* | 5/2002 | Ellis et al. | 345/716 |
| 2004/0117831 A1* | 6/2004 | Ellis et al. | 725/53 |

OTHER PUBLICATIONS

Chung-Sheng Li et al., Distributed Application Service for Internet Information Portal, *IEEE International Symposium on Circuits and Systems*, May 28-31, 2000, Geneva, Switzerland, pp. IV-289-IV-292.

MEGABYTE Technology, *The MbTV Core Technology Consists of a Preference Determination Engine and a Storage Management Engine*, printed Oct. 2, 2000, from http://www.mbtv.com/technology.htm, 2 pages.

*MEGABYTE Products and Services Personalized Television*, printed Oct. 2, 2000, from http://www.mbtv.com/ptv.htm, 2 pages.

*MEGABYTE Products and Services Digital VCR*, printed Oct. 2, 2000, from http://www.mbtv.com/digital_vct.htm, 1 page.

*TIVO Tour,and Demo*, printed Oct. 2, 2000, from http://www.tivo.com/what/tour.html, p. 1 and pp. 1-16.

*MEGABYTE Preference Determination Engine*, printed Oct. 2, 2000, from http://www.mbtv.com.pde.htm, 1 page.

\* cited by examiner

SYSTEM AND METHOD FOR CREATING AND DISPLAYING A PREFERENCE BASED MENU FOR A VIEWING SESSION

BACKGROUND OF THE INVENTION

1. Field of the Invention

The invention relates to a system for receiving and displaying video data. More particularly, the invention relates to a system and method for creating and displaying a preference based menu.

2. Description of the Related Art

A conventional system for receiving and displaying video data includes a monitor or a television (TV) set connected to a set top box. The set top box is connected through a coaxial cable to a cable TV network or a satellite dish for "satellite TV." The TV set and the set top box are located in a viewer's home and receive a multitude of TV channels from a broadcast head end, wherein each TV channel has a multitude of programs during a typical day. In order to select and watch a certain program the viewer usually uses a remote control to control at least the set top box to tune to a desired channel. The TV set receives a video signal from the set top box and displays the program of the desired channel.

The viewers often expand the system by connecting a video recorder between the TV set and the set top box in order to overcome the rigid time schedule according to which the programs are broadcast. Thus, a viewer can personalize television viewing by recording a program and watching it when it is convenient for the viewer. The video recorder may be a digital video recorder that includes a hard disk drive with a storage capacity of between 10 GB and 30 GB for recording of up to 30 hours of television programming.

In addition to using a video recorder, alternative systems provide for even more flexibility and viewer-specific television. For example, the digital video recorders (also referred to as personal video recorders) offered by Replay Networks in combination with ReplayTV service and offered by Philips in combination with TiVo service allow the viewer to personalize television viewing. For instance, the personal video recorder can learn a viewer's preferred programs and automatically record programs it expects a viewer to like. The viewer can also, among other activities, watch and pause live TV. That is, the viewer can pause a favorite show when someone calls and pick up the show again exactly where the viewer left off.

Furthermore, the conventional system may enable the viewer to subscribe to and receive premium contents such as subscription channels, pay-per-view services or video-on-demand services in order to watch a movie on a certain day and at a time of day. For example, access to a pay-per-view movie is usually conditioned upon the payment of a fee. Providers of these services want to attract as many viewers as possible, which becomes difficult with increasing viewing options for the viewers.

These conventional systems provide for a certain degree of personalized television, but the viewer still makes a selection on a program-by-program basis. However, because of the multitude of broadcast channels and the additional services (e.g., pay-per-view services and video-on-demand services), the viewer is required to make many searches through program guides, multiple decisions about what to watch, and many manual changes during a multi-hour viewing session in order to watch a preferred channel or program during this viewing session. An additional burden is that the program guides are presented to the viewers in different formats. That is, a printed or electronic program guide for broadcast programs may have a different format than an electronic program guide for pay-per-view services and video-on-demand services.

There is therefore a need to further improve upon the prior art technique of displaying video data in order to assist a viewer in making the selections for the viewing session.

SUMMARY OF THE INVENTION

The present invention may be regarded as a method of generating a menu representing a viewing sequence of display contents during a viewer's viewing session. The method records a first plurality of display contents and a second plurality of display contents. The first plurality of display contents is selected using a preference engine. The second plurality of display contents is selectively recorded upon a viewer selecting the display contents for recording. The method further defines a viewing session and a third plurality of display contents based upon available broadcast display contents during the viewing session and selected based upon the preference engine. The method displays a menu of viewing choices that comprises at least one of the first plurality of display contents, the second plurality of display contents and the third plurality of display contents.

Further, the present invention may be regarded as a video system having an input port to receive display contents including a plurality of broadcast display contents, and an output port to couple to a video display. Further, the system includes a preference engine, a storage device and a management module. The preference engine is coupled to the input port and tracks viewer selections of the broadcast display contents to create a viewer profile. The storage device is coupled to the input port, the output port and the preference engine, and records a first plurality of display contents according to the viewer profile and a second plurality of display contents upon a viewer selecting the display contents for recording. The management module is coupled to the preference engine and the storage device, and defines a third plurality of display contents based upon the available broadcast display contents for a viewing session and based upon the viewer profile. Further, the management module creates a menu of viewing choices comprising at least one of the first plurality of display contents, the second plurality of display contents and the third plurality of display contents. The menu is displayable on the video display from which a viewer can select a sequence of display contents for the viewing session.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
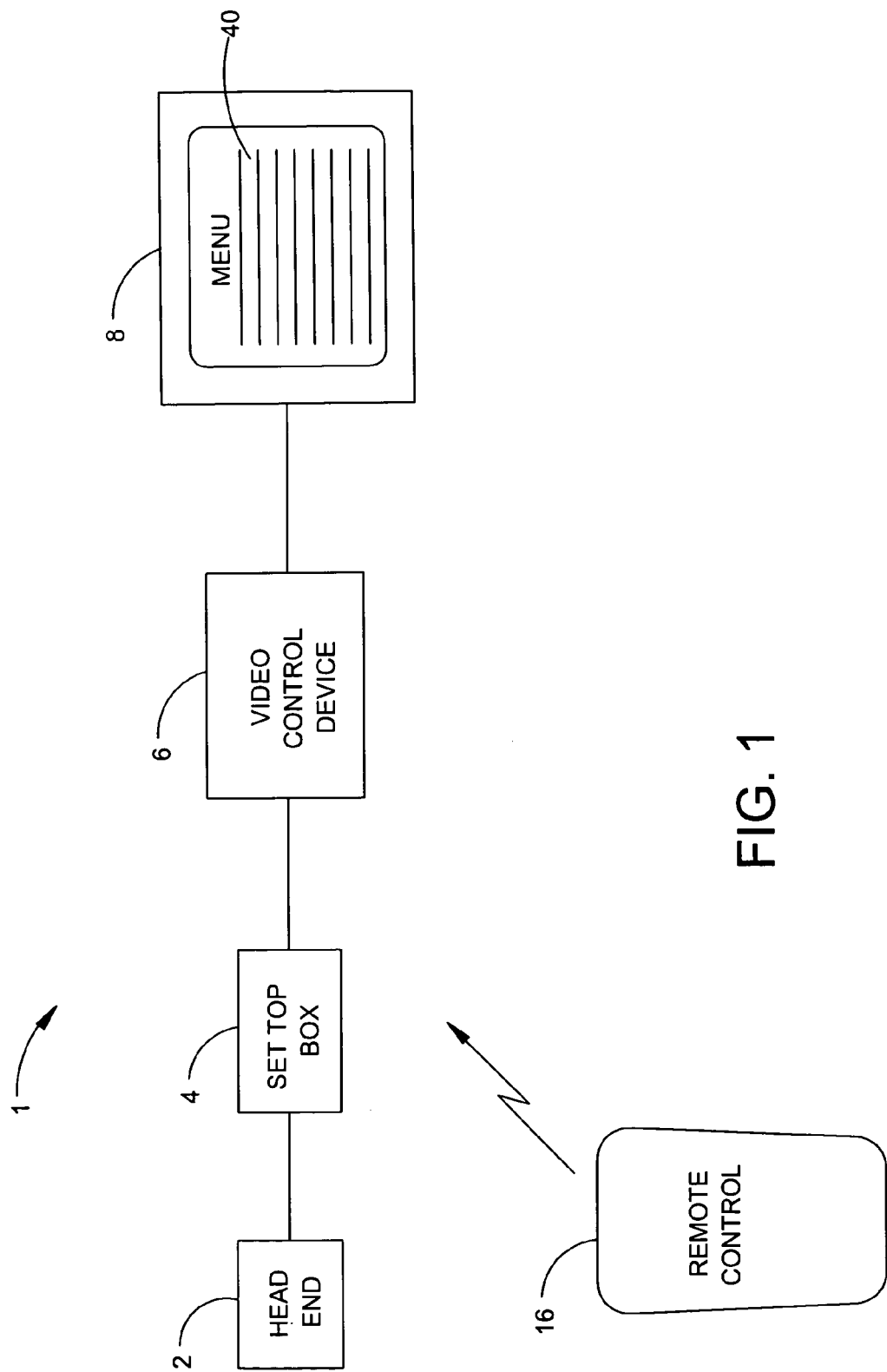
FIG. 1 is a high-level block diagram of a system for displaying video data in accordance with an embodiment of the present invention that includes a set top box and a video control device connected to a display for displaying a menu of preferred display contents from which a viewer can select display contents for display during a viewing session.

FIG. 1 is a high-level blockdiagram of a system 1 for displaying video data in accordance with an embodiment of the present invention and suitable for practicing a method in accordance with the present invention. The system 1 includes a set top box 4, a remote control 16 and video control device 6 (e.g., a digital video recorder) coupled to a display 8 for displaying a menu 40 of viewing choices. The set top box 4 is coupled to a broadcast head end 2 that transmits broadcast display contents to the set top box 4 that is, for example, located within a viewer's home. The system 1 and its components are described below in more detail.

Figure 2:
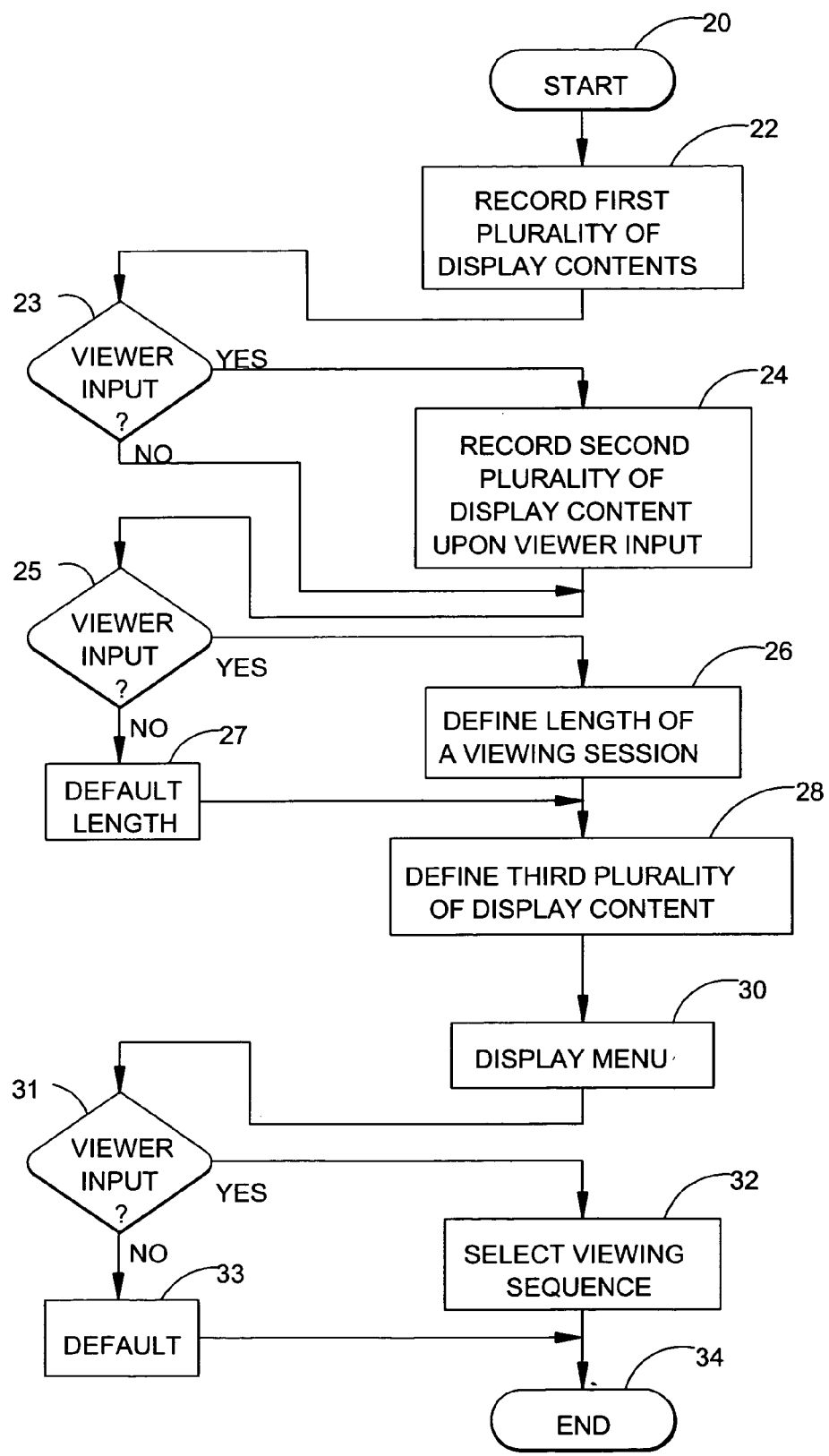
FIG. 2 is a flow chart of a method in accordance with an embodiment of the present invention that records a first plurality of display contents, selectively records a second plurality of display contents upon viewer input, defines a third plurality of display contents and allows a viewer to select a viewing sequence from the menu of preferred display contents.
Figure 2A:
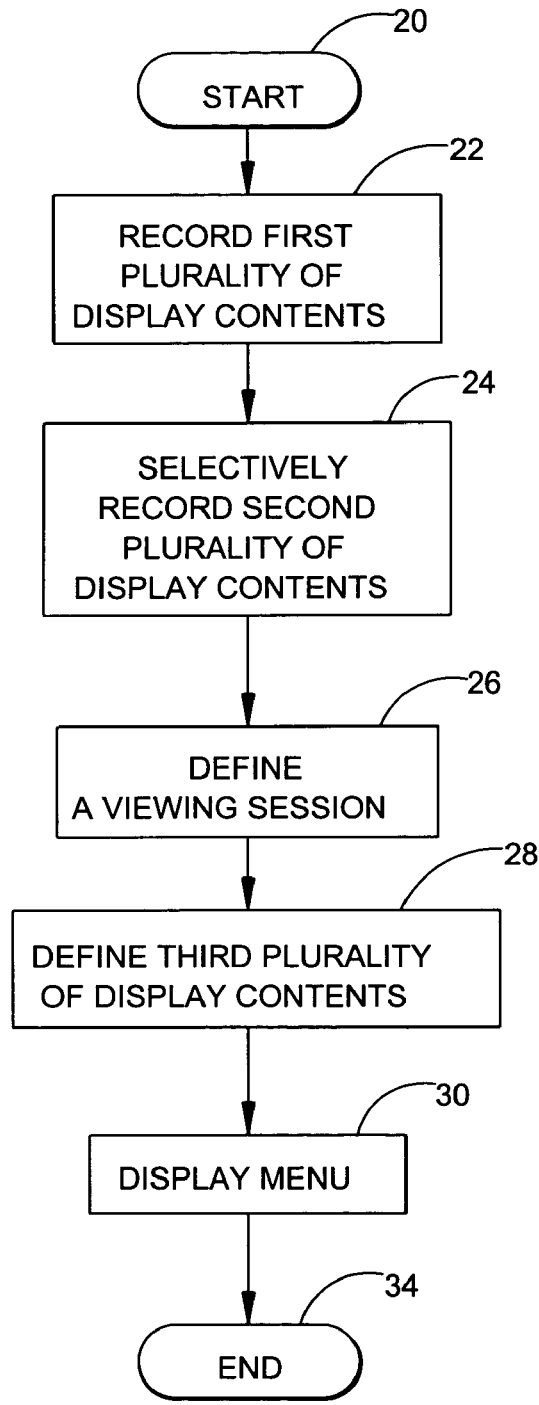
FIG. 2A is a flow chart of a method in accordance with an embodiment of the present invention that records a first plurality of display contents, selectively records a second plurality of display contents and defines a third plurality of display contents used to create the menu of preferred display contents.

In one embodiment of the invention, the menu 40 is generated in accordance with a method illustrated by a procedure shown in a flowchart in FIG. 2A. The procedure in FIG. 2A is initialized in a step 20, and then proceeds to a step 22. In the step 22, the procedure records a first plurality of display contents using a preference engine to select the display contents for recording and using a storage device to store video data representing the first plurality of display contents.

Next, in a step 24, the procedure selectively records a second plurality of display contents upon a viewer selecting the display contents for recording. The second plurality of display contents may be stored also on the storage device.

Next, in a step 26, the procedure defines a viewing session. The viewing session may be defined through the time of the beginning and the time of the end of the viewing session. In another embodiment, the procedure defines the viewing session for immediate viewing, for example, for a predetermined length upon a viewer activating the system 1.

Next, in a step 28, the procedure defines a third plurality of display contents. The third plurality of display contents is based upon available broadcast display contents during the viewing session and selected using the preference engine.

Next, in a step 30, the procedure displays the menu 40 of viewing choices on the display 8. The menu 40 includes at least one of the first plurality of display contents, the second plurality of display contents and the third plurality of display contents. The procedure ends in a step 34.

Figure 2B:
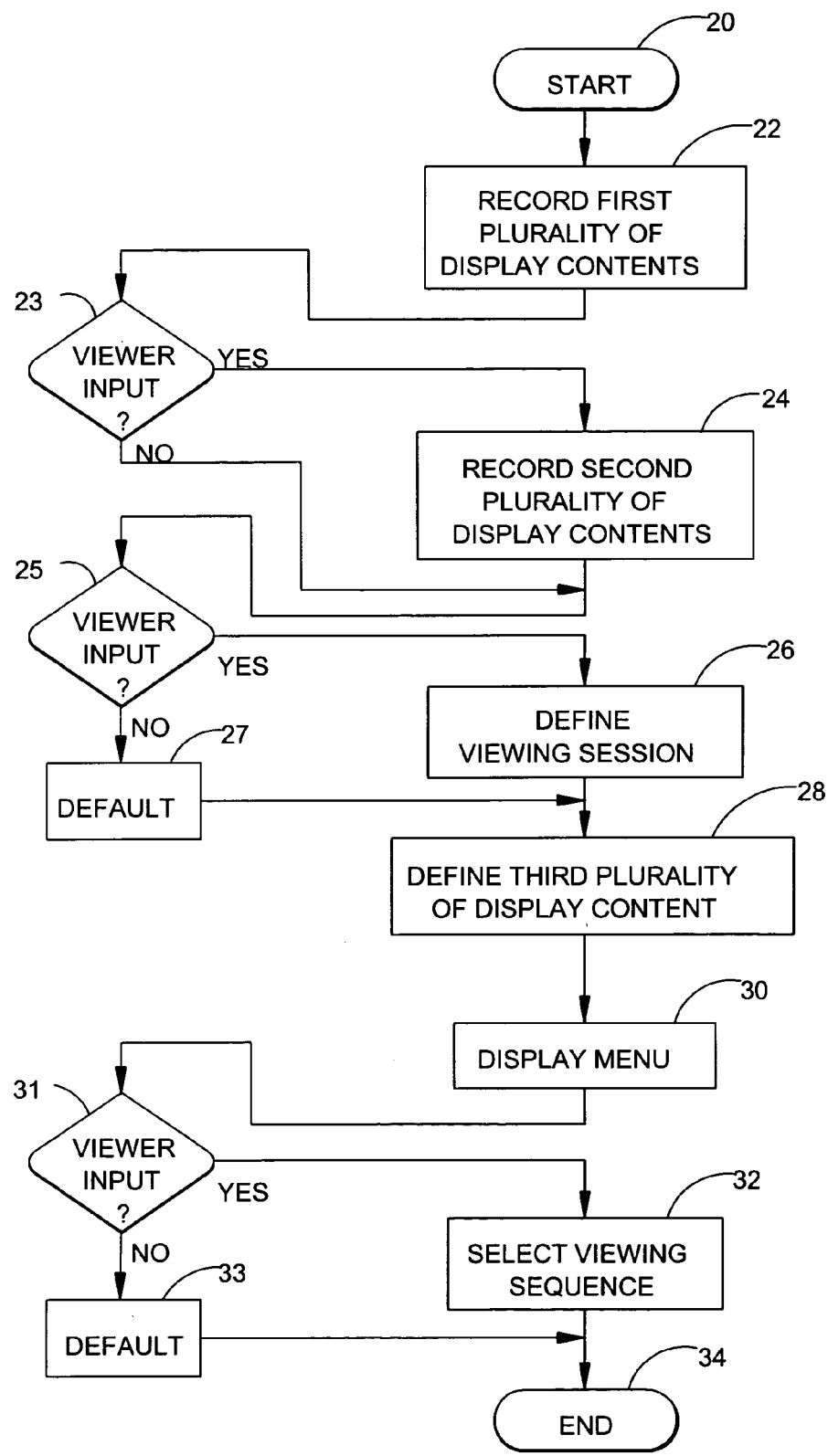
FIG. 2B is a flow chart of a method in accordance with another embodiment of the present invention that records a first plurality of display contents, selectively records a second plurality of display contents, defines a third plurality of display contents and allows a viewer to select a viewing sequence from the menu of preferred display contents.

FIG. 2B is a flow chart of a procedure illustrating a method in accordance with another embodiment of the present invention. In addition to defining the procedure of this embodiment, the flow chart of FIG. 2B includes a more detailed illustration of the method shown in FIG. 2A. Corresponding steps in FIG. 2B therefore have the same reference numerals as in FIG. 2A. In the step 20, e.g., when the viewer turns the display 8 and the set top box 4 on, the procedure initializes the system 1. The initialization step 20 includes determining whether the set top box 4 is operating and is properly connected to receive broadcast display contents from the broadcast head end, and also includes determining how much storage capacity is available on the storage device. Further, the initialization procedure 20 determines whether additional devices are connected to the video control device 6.

Next, in the step 22, the procedure records the first plurality of display contents, for example, on the storage device. The first plurality of display contents is determined in accordance with a viewer profile created by the preference engine. The preference engine learns a viewer's watching preferences by monitoring the viewer's viewing patterns and uses these viewing patterns to create a viewer profile. In one embodiment, the viewer profile may be stored within the storage device. The first plurality of display contents, therefore, includes display contents (e.g., particular programs and particular genres of movies) this viewer usually prefers. The procedure records the first plurality of display contents together with bibliographic data and summaries of the contents. In one embodiment, the procedure also tags the first plurality of display contents to identify it as content selected based upon the viewer profile.

Next, in a step 23, the procedure provides for selective recording of the second plurality of display contents. If the viewer decides to record a specific display content, the viewer can immediately record the specific display content or program the system 1 to record the specific display content on a specific day and time, which is similar to operating a conventional video recorder. Thus, if the viewer inputs a recording request, the procedure proceeds along the YES branch to the step 24. However, if the procedure does not detect a viewer input, the procedure proceeds along the NO branch to a step 25.

In the step 24, the procedure records the second plurality of display contents as determined by the viewer. Further, the procedure records the second plurality of display contents together with bibliographic data and a summary of the content. The procedure may tag the second plurality of display contents to identify it as content intentionally recorded by the viewer.

In steps 25, 26, 27 the procedure defines a viewing session. That is, the viewer may request that the menu covers a certain time frame. For example, the viewer can define the viewing session for the day by inputting the time at which the viewer wants to start watching and the time at which the viewer wants to end watching. If the viewer decides to individually define the viewing session, the procedure proceeds along the YES branch of the step 25 to the step 26, in which the procedure determines the viewing session. However, if the procedure does not detect a viewer input, the procedure proceeds along the NO branch to the step 27. In the step 27, the procedure assumes a default setting. For instance, in one embodiment, the system 1 may be configured to automatically set a four-hour viewing session beginning at the time of activating the system 1.

Next, in the step 28, the procedure defines the third plurality of display contents using the viewer profile. The third plurality of display contents includes "live" broadcast display contents that are available during the viewing session as defined in the step 26 or in the step 27 and that match the viewer profile. That is, the "live" broadcast display contents include only contents that has a high probability of acceptance by the viewer. Display contents that the viewer usually does not watch are not included in the third plurality of display contents.

Next, in the step 30, the procedure displays the menu 40 of viewing choices on the display 8. The menu 40 includes at least one of the first plurality of display contents, the second plurality of display contents and the third plurality of display contents. In one embodiment, the menu 40 shows the tags assigned to the first and second pluralities of display contents to inform the viewer about the origins of the display contents. The "live" broadcast display contents may be identified by the respective channel numbers, or the names of the respective TV stations. An embodiment of the menu is shown in FIG. 3.

Next, in a step 31, the procedure allows the viewer to select from the menu 40 displayed on the display 8. If the viewer decides to select from the menu 40, the procedure proceeds along the YES branch to a step 32. In the step 32, the procedure allows the viewer to select the display contents during the viewing session. For instance, the viewer may click on the various display contents which are thereby selected to be added to a To Do list 41 shown in FIG. 4. As described below, the procedure tracks the selections and creates in one embodiment an error message if the selection creates a conflict, for example, if the selected "live" broadcast display contents have overlapping broadcast times. If the viewer does not want to individually select the menu, the procedure proceeds along the NO branch to a step 32.

Figure 4:
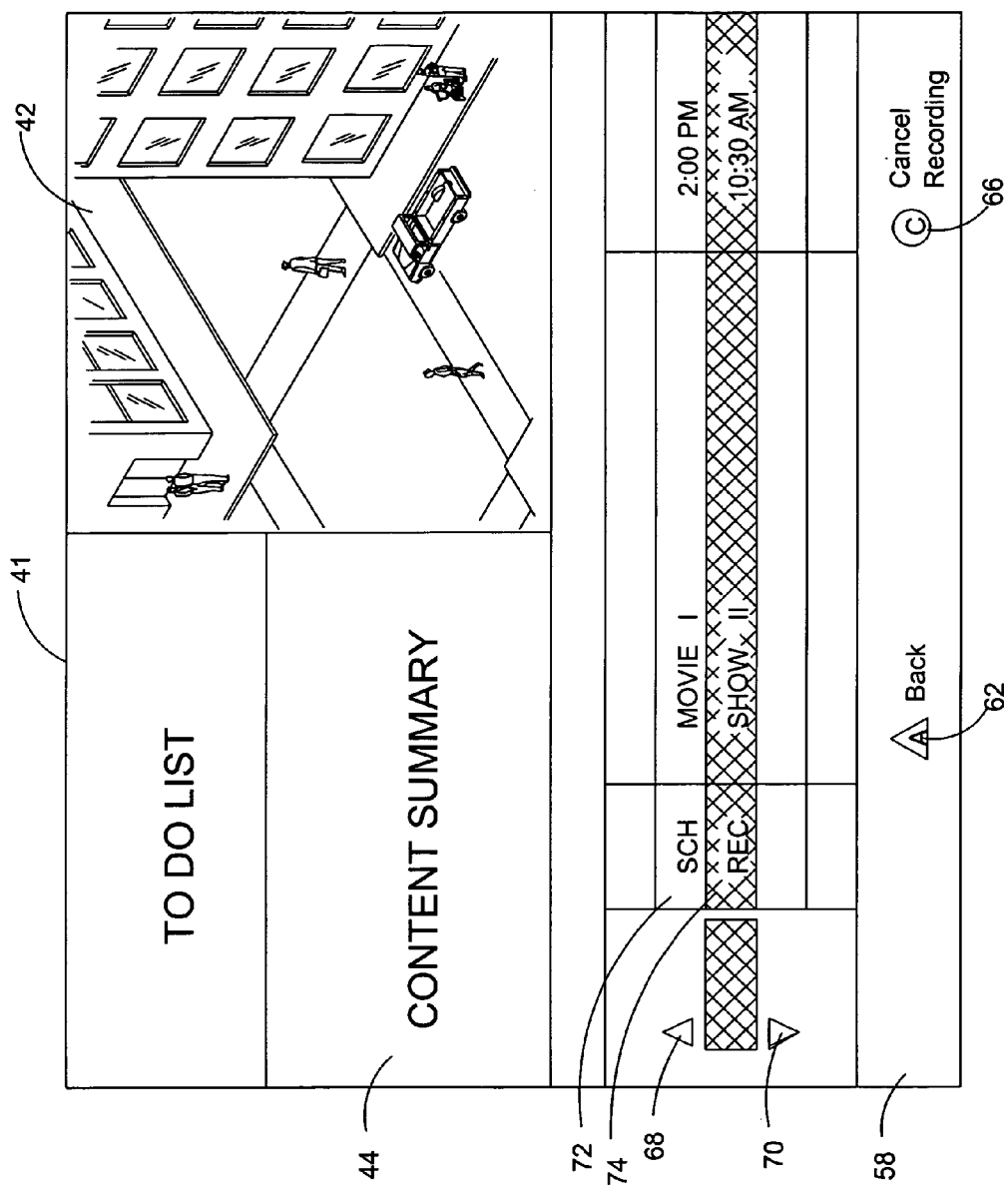
FIG. 4 is an illustration of a To Do List in accordance with an embodiment of the present invention that the viewer created based upon the menu for viewing during the viewing session.

In the step 32, the procedure assumes a "default" To Do List 41. In one embodiment, the pluralities of display contents may be ranked in accordance with the viewer profile generated by the preference engine. If the viewer does not make a selection, the procedure selects those display contents that are ranked the highest to fill up the viewing session. This provides that absent a viewer input the To Do List 41 includes, for example, the "Top 10" of the viewer's preferences. The generated To Do List 41 is displayed on the display 8 as shown in FIG. 4. The procedure ends in a step 34.

Figure 3:
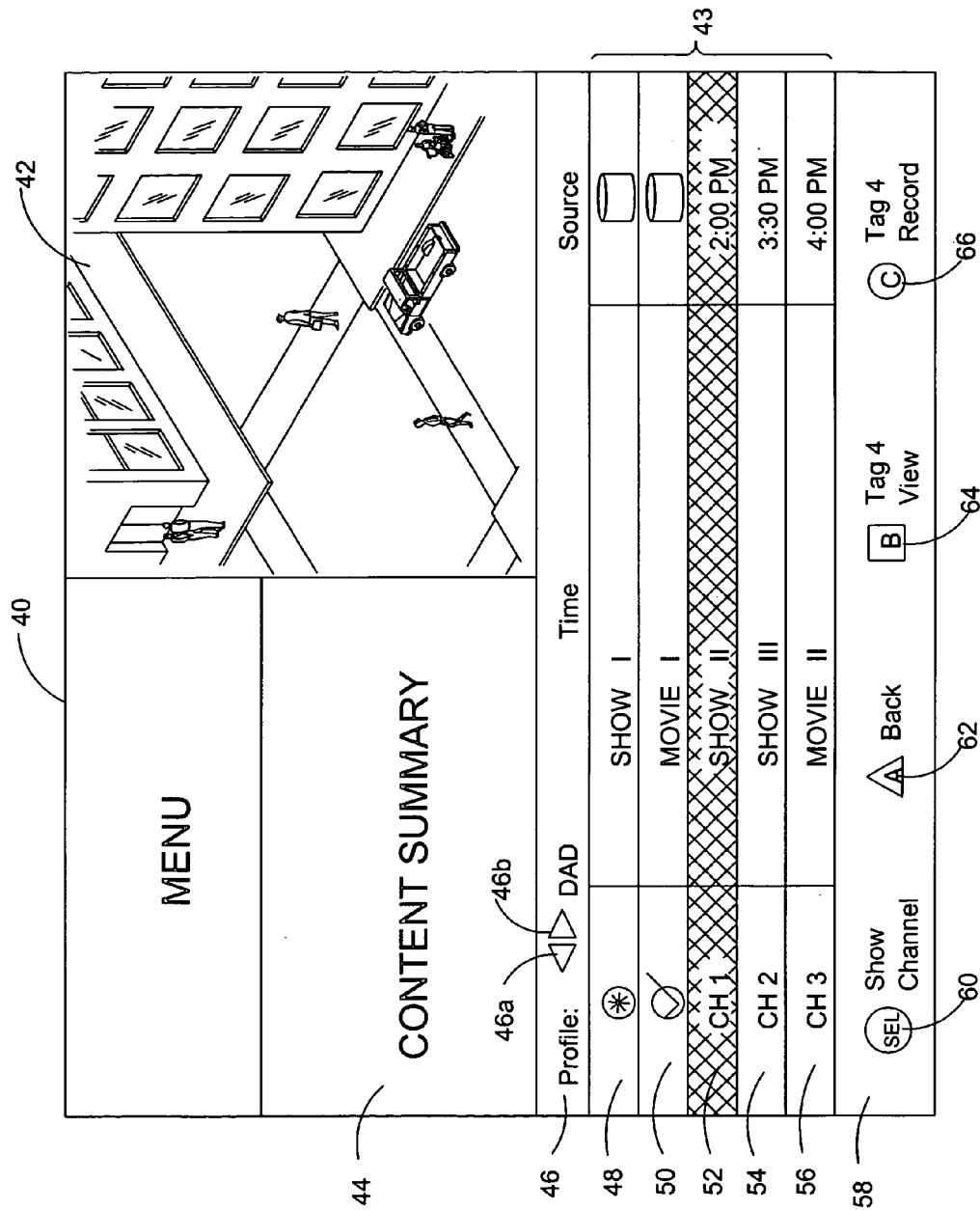
FIG. 3 is an illustration of the menu in accordance with an embodiment of the present invention that includes a first plurality of display contents selected by a preference engine for a specific viewer, a second plurality of display contents selected by the viewer and a third plurality of display contents including available broadcast display contents.

FIG. 3 is an illustration of one embodiment of the menu 40 in accordance with an embodiment of the present invention. The exemplary menu 40 is divided into several sectors. From top to bottom, the menu 40 includes a sector 42 for the display of a selected display content, a sector 44 for a summary of the content of the display content, a sector 46 indicating, among others, the viewer profile, a sector 43 for a list of the first, second and third pluralities of display contents, and a control sector 58.

As illustrated in the sector 46, the present viewer is DAD and the system 1 used DAD's viewer profile to generate the menu 40. The sector 46 may further indicate the time and the source for the display contents highlighted in the sector 43 of the menu 40. It is contemplated that the system 1 may be set up for several viewers, for example, for all members of a family. The preference engine 10 creates a viewer profile for each family member. Arrows 46a, 46b allow a new viewer to change the menu 40 for DAD to a menu for a new viewer, e.g., the mother of a family.

In the sector 43, the display contents are listed in rows 48, 50, . . . , 56, which in one embodiment represent a ranking of the display contents. It is contemplated that the menu 40 may include more options for the display contents. In one embodiment, the menu 40 may include 20 options, wherein ten options may be recorded display contents and wherein ten options may be "live" broadcast display contents.

Row 48 represents a display content SHOW I and indicates through a star (*) that it has been recorded on the storage device 14 by the preference engine 10. The storage device 14 is indicated by using a symbol for a hard disk drive. Row 50 represents a display content MOVIE I and indicates through a check mark that it has been recorded by the viewer on the storage device 14. Rows 52-56 represent "live" broadcast display contents on channels CH1, CH2, CH3, respectively, as determined and ranked by the preference engine 10. For each channel, the menu 40 shows the time at which the "live" broadcast display contents starts. In the illustrated menu 40, the viewer selected SHOW II as indicated through a "highlighted" row 52. The menu 40 shows a summary of the SHOW II in sector 44 and a preview of the SHOW II in sector 42.

The control sector 58 includes several control options represented as buttons 60, 62, 64, 66 that a viewer can select ("click') using the remote control 16. The (SEL) button 60 allows the viewer to close the menu 40 and to show the display content of sector 42 in full size. The (A) button 62 allows the viewer to return to the previous screen shown on the display 8, similar to the "BACK" function of a conventional Internet browser (e.g. NETSCAPE or Microsoft Internet Explorer). The (B) button 64 allows the viewer to sequentially select from the menu 40 to create the To Do List 40. By scrolling to a desired display content in one of the rows 48-56 and then clicking the button 64, the viewer tags each selection for adding to the To Do List 40 and for viewing during the viewing session. Likewise, by scrolling to a desired display content in one of the rows 48-56 and then clicking the (C) button 66, the viewer tags each selection for recording.

FIG. 4 is an illustration of one embodiment of the To Do List 41 in accordance with an embodiment of the present invention that the viewer created based upon selections from the menu 40 shown in FIG. 3. The To Do List 41 has a similar structure as the menu 40, except that in this embodiment the sector 46 is not shown and that the To Do List 41 shows a modified control sector 58. The modified control sector 58 shows the (Back) button 62. In the To Do List 41, the (C) button 66 allows the viewer to cancel recording of a program.

The illustrated To Do List 41 includes the contents MOVIE I and SHOW II, wherein the content SHOW II is currently being recorded (REC). Using arrows 68, 70 the viewer can scroll up and down to select other contents or actions for execution. The control sector 58 shows the (A) button 62, which allows the viewer to return to a previous menu. The (C) button 66 allows the viewer to stop recording the content SHOW II.

Generally, the To Do List 41 is a list of tasks the system 1 executes upon initiation by the viewer. In one embodiment, the list of tasks is the viewing sequence that is sequentially executed during the viewing session. In another embodiment, the list of tasks may include the viewing sequence and additional tasks or actions, for example, the task of recording a specific display content.

Figure 5:
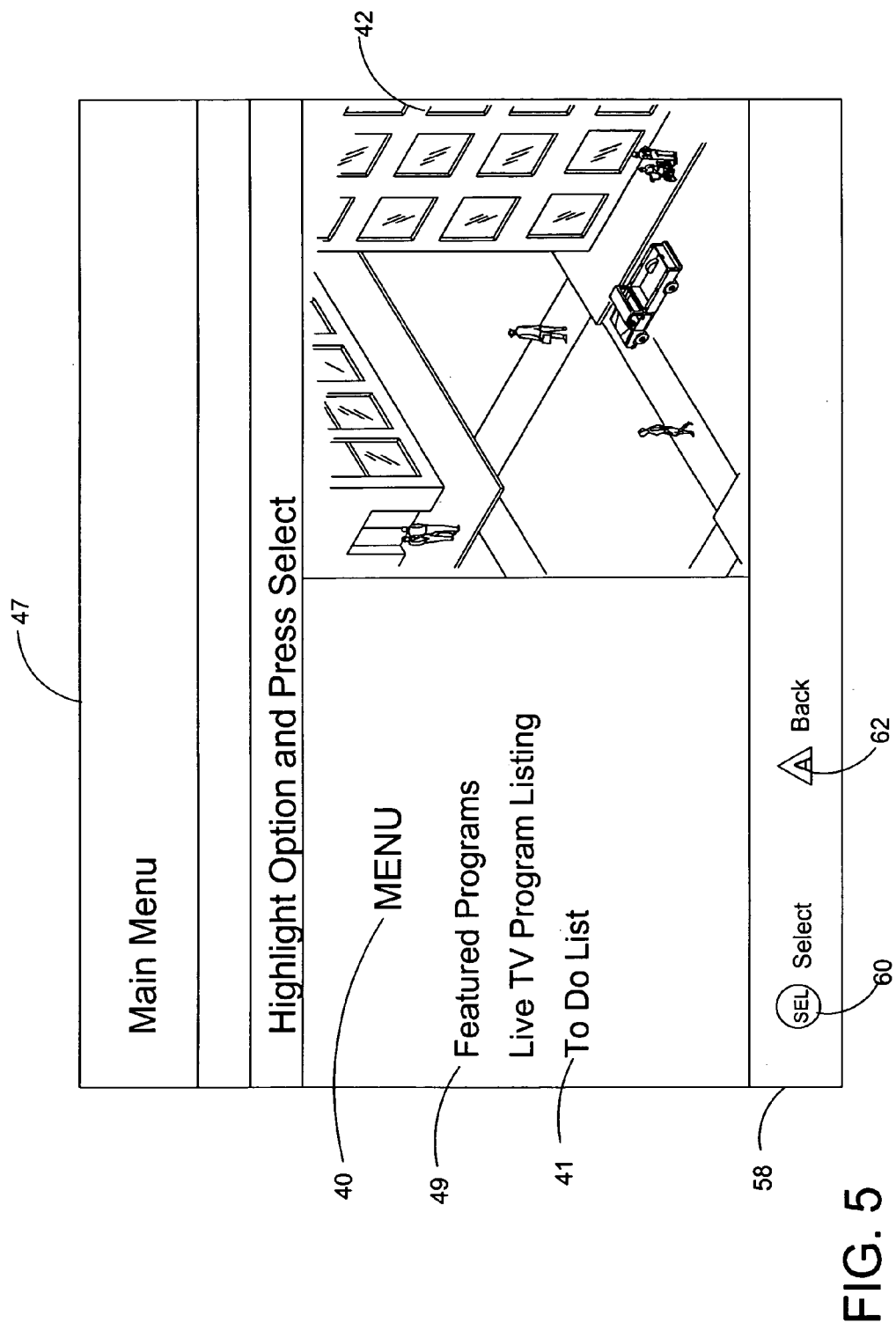
FIG. 5 is an illustration of a main menu in accordance with an embodiment of the present invention that includes the menu, the To Do List, a list of featured programs and a TV program listing, one of which the viewer can select to control and to set the system.

FIG. 5 is an illustration of a main menu 47 in accordance with an embodiment of the present invention that lists the menu 40, the To Do List 41, a list 49 of featured programs, a TV program listing, and a Setup menu, one of which the viewer can select to control and to configure the system 1. The control sector 58 of the main menu 47 shows the (SEL) button 60 and the (BACK) button 62. The system 1 may be configured that whenever the viewer turns the system 1 on, the main menu 47 displays a "Welcome" screen and is the first screen the viewer sees. From this main menu 47, the viewer may navigate, for example, to the menu 40.

Figure 6:
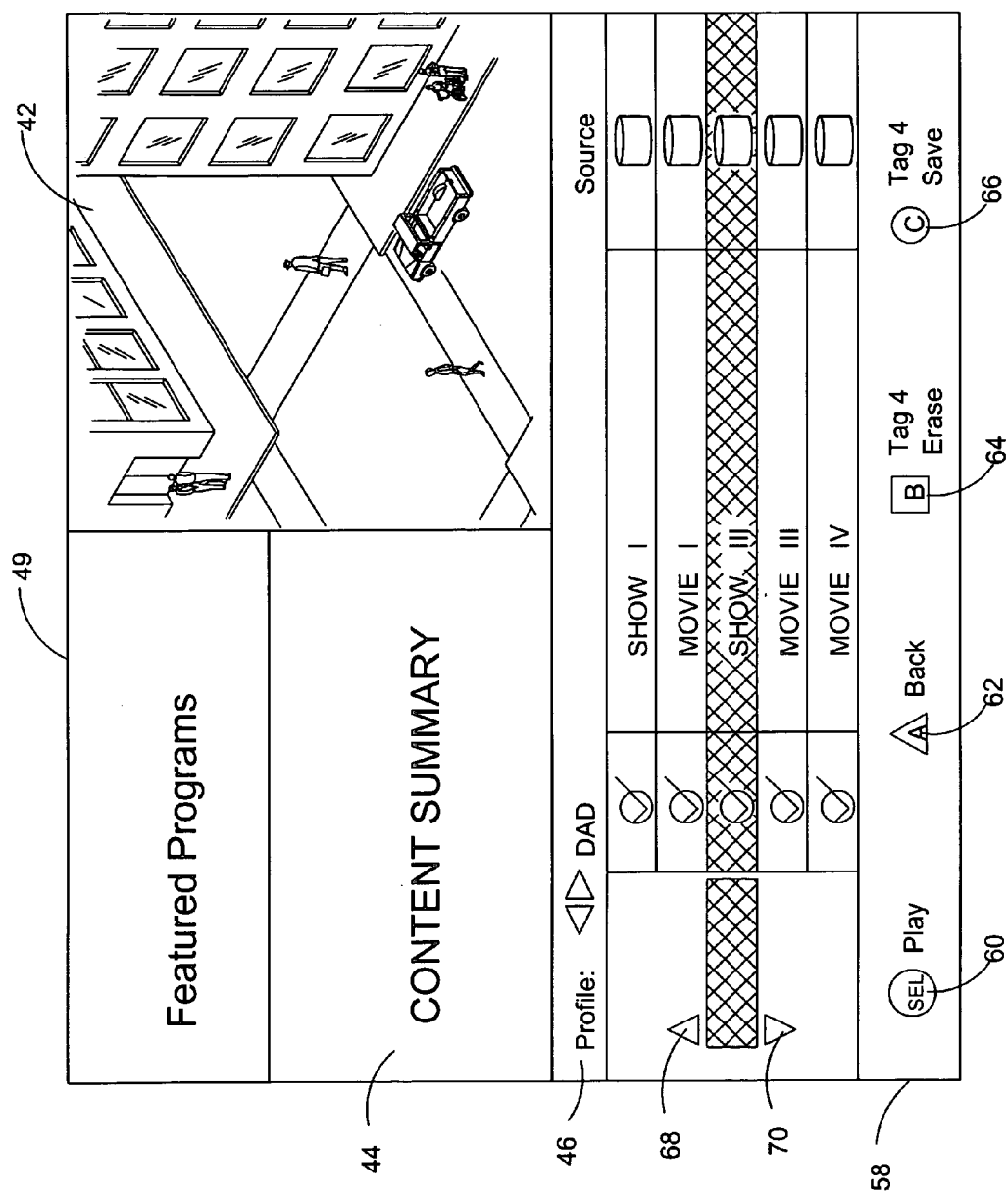
FIG. 6 is an illustration of the list of featured programs representing display contents stored on a storage device.

FIG. 6 is an illustration of one embodiment of the list of featured programs 49 included in the main menu 47 shown in FIG. 5. The list 49 of featured programs has a similar structure as the menu 40 and represents the display contents stored on the storage device 14 as indicated through the symbols for a hard disk drive. The list 49 of featured programs serves as a list of content of the storage device 14. In the illustrated embodiment, the viewer selected the content SHOW III, as indicated through a "highlighted" row. Using arrows 68, 70, the viewer may scroll up or down and select one of the other contents SHOW I, MOVIE I, MOVIE III and MOVIE IV.

The control sector 58 shows the buttons 60, 62, 64, 66. Upon the viewer selecting a content and clicking the (SEL) button 60, the system 1 displays (plays) the selected content on the display 8. The (B) button 64 allows the viewer to selectively erase stored content, and the (C) button 66 allows the viewer to tag a stored content to (permanently) store it to avoid unintentional deleting it. The (BACK) button 62 operates as discussed above.

The various menus described above assist the viewer in selecting from the multitude of programs those programs that are preferred by the viewer and available during the viewing session. The menus guide the viewer to a preferred program or content without the need to study a voluminous program guide and without the inconvenience of first "zapping" through a variety of channels to find a preferred content.

Figure 7:
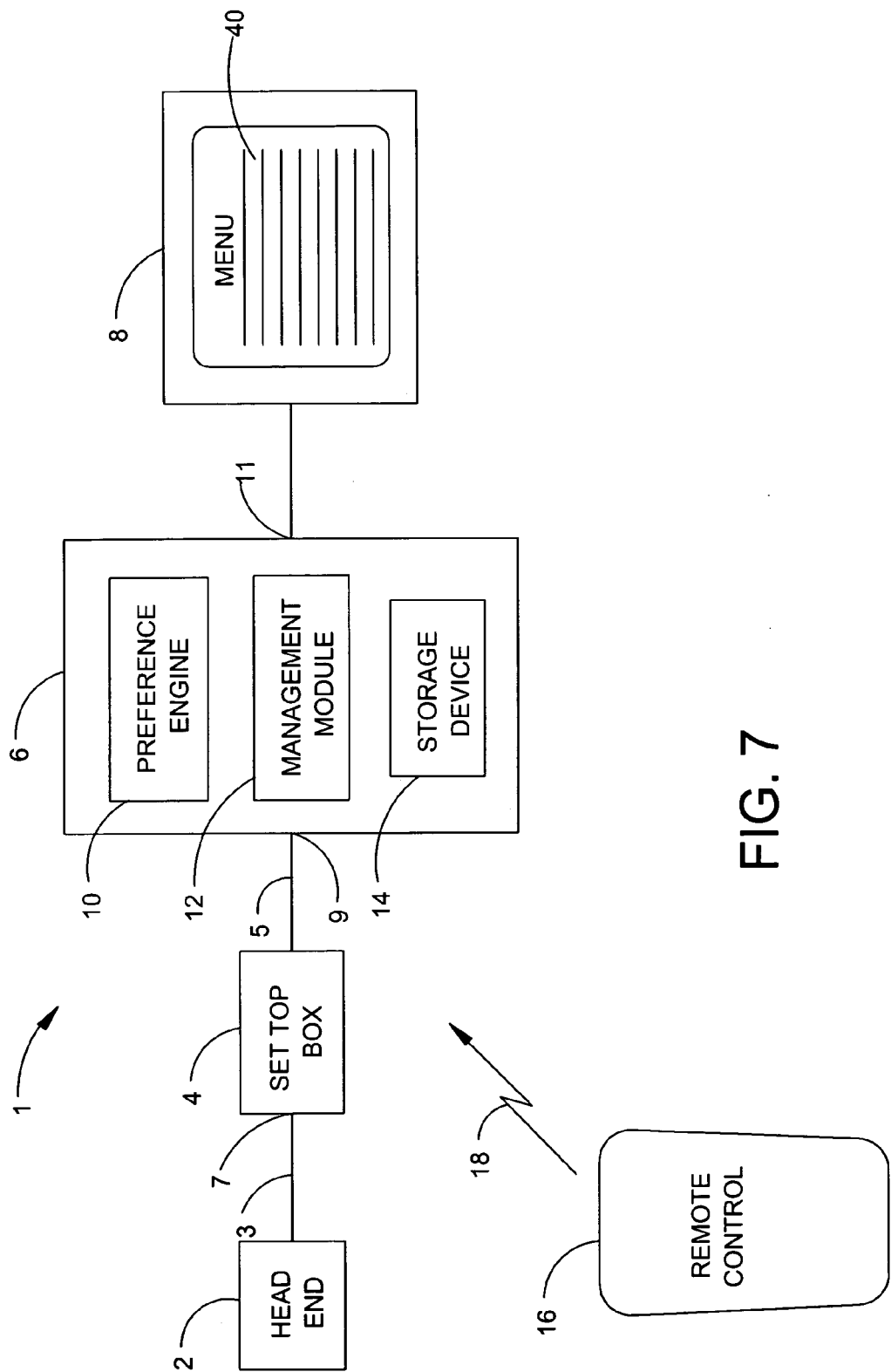
FIG. 7 is a more detailed illustration of the system for displaying video data shown in FIG. 1, wherein the system includes a set top box and a video control device connected to a display for displaying a menu of preferred display contents, and wherein the video control device includes a preference engine, a management module and a storage device.

FIG. 7 is a more detailed illustration of the system 1 for displaying video data shown in FIG. 1. Corresponding components of the system 1 have the same reference numerals. The set top box 4 is coupled to the broadcast head end 2 via a link 3, wherein the link 3 is connected to an input port 7 of the set top box 4. A link 5 connects the set top box 4 to an input port 9 of the video control device 6. The input port 7 receives display contents including a plurality of broadcast display contents from the broadcast head end 2, and the input port 9 receives display contents from the set top box 4. An output port 11 of the video control device 6 is coupled to the video display 8.

The set top box 4 and the video control device 6 may be combined into a single apparatus. The apparatus then combines the functionalities of the set top box 4 and the video control device and has an input port (e.g., the input port 7) to receive the display contents from the broadcast head end 2.

The system 1 further includes a preference engine 10, a management module 12 and a storage device 14 which, in one embodiment, are located within the video control device 6. The preference engine 10 is coupled to the input port 9 and is thus coupled to the input port 7 via the set top box 4. The preference engine 10 is configured to track viewer selections of the broadcast display contents and to create a viewer profile. The storage device 14 is coupled to the input port 9 and is thus coupled to the input port 7 via the set top box 4, to the output port 11 and to the preference engine 10. The storage device 14 records the first plurality of display contents according to the viewer profile and selectively records the second plurality of display contents upon a viewer selecting the display contents for recording.

The management module 12 is coupled to the preference engine 10 and the storage device 14. The management module 12 defines the third plurality of display contents based upon the available broadcast display contents for defined viewing session and based upon the viewer profile. Further, the management module 12 creates the menu 40 of viewing choices. The viewing choices include at least one of the first plurality of display contents, the second plurality of display contents and the third plurality of display contents. The system 1 displays the menu 40 on the video display 8 from which a viewer can select a sequence of display contents for the viewing session.

The broadcast head end 2 provides broadcast video data that includes a multitude of channels with a multitude of programs having audio and video data. The broadcast head end 2 may further enable the viewer to subscribe to and receive subscription services and conditional access broadcast services, such as video-on-demand or pay-per-view services. The broadcast head end 2 is often in the domain of a multiple-service operator, also known as an MSO. MSOs are video data service providers that supply video programming to multiple users. The format of the broadcast video data may be in accordance with known video and television formats, such as NTSC, PAL, S-Video or the like.

The link 3 may be a conventional coaxial cable and may be part of a cable TV distribution network that serves a plurality of households. Further, it is contemplated that the link 3 between the set top box 4 and the broadcast head end 2 may be a wireless link, e.g., as part of a satellite TV network or a UHF/VHF TV network. Hereinafter, the set top box 4 is connected to the broadcast head end 2 through a conventional coaxial cable.

The set top box 4 includes at least one tuner that selects one of the channels of the broadcast video data provided by the broadcast head end 2. Using the remote control 16, the viewer can control the set top box 4 to tune to a selected channel. In one embodiment of the present invention, the set top box 4 receives an electronic program guide from the broadcast head end 2. The electronic program guide is a database containing information regarding the broadcast schedules for various video program segments from various broadcast channels. This information is typically expressed in the form of a program grid with columns denoting the time periods, and with separate rows for each of the available broadcast channels.

The video control device 6 communicates with the set top box 2 through the link 5. The link 5 may include an interface that provides digital communication between the set top box 4 and the video control device 6. In one embodiment, the interface is in accordance with the IEEE 1394 standard as described below. The storage device 14 may be a hard disk drive (HDD) that has a storage capacity of, for example, between 10 GB and 30 GB to selectively store, and thus record, digital information such as sequences of video data. That is, the storage device 14 may store up to 80 hours of compressed video and audio data. The compression is often achieved by using a standardized process defined by the Moving Picture Expert Group (MPEG), e.g., MPEG-2. The recorded video data is then available for later reproduction when the viewer decides to watch the recorded video data.

It is contemplated that in one embodiment, the video control device 6 may be configured to perform MPEG-2 compression and decompression and to selectively store the MPEG-2 compressed video data. In another embodiment, the system 1 may be configured so that the video control device 6 receives MPEG-2 compressed video data. Thus, the storage device 14 selectively stores the MPEG-2 compressed video data without requiring compression within the video control device 6. The stored compressed video data may be decompressed outside the video control device 6.

The preference engine 10 is a software module that learns a viewer's watching preferences by monitoring the viewer's viewing patterns. The preference engine 10 uses the viewing patterns to create a viewer profile which may be stored on the storage device 14. Thus, the preference engine 10 narrows the multitude of programs down to a reasonable number of program choices based upon the viewer's actual viewing patterns. One embodiment of the preference engine 10 is a software module that is commercially available from Metabyte Networks, Inc.

The management module 12 is a software module that cooperates with the preference engine 10 and the storage device 14 and that manages the recording and retrieval of the display contents. For instance, the management module 12 determines how much storage capacity is available on the storage device 14 and obtains the kind of display content that is recorded including the duration of each recorded display content. The kind of display content and the duration are obtained using information provided by the electronic program guide. The management function of the management module 12 includes further to provide for automatic channel changes in accordance with the To Do List 41.

Further, the management module 12 follows the selections a viewer makes during the step of defining the To Do List 41. This allows the management module 12 to identify conflicts that occur when, for example, the broadcast times of programs overlap or when a selected program is not available. In case of a conflict, the management module 12 creates a message that alerts the viewer to the conflict and may prompt the viewer to manually resolve the conflict or change the selection.

The management module 12 also determines if there are gaps in the viewer-selected To Do List 41. For example, the viewer may select display content for the time between 8 p.m. and 9 p.m. and between 10 p.m. and 11 p.m., but make no selection for the time between 9 p.m. and 10 p.m. The management module 12 may fill this gap with pre-recorded display contents or "live" broadcast display contents based upon the viewer profile as determined by the preference engine 10.

FIGS. 1 and 2 shows the general structure of the system 1. Those skilled in the art will appreciate that in an alternative embodiment, the set top box 2 and the video control device 6 may be combined to a single apparatus. Further, it is contemplated that in another embodiment, the video control device 6 may be implemented within a digital (personal) video recorder that may be coupled to the set top box 4 and the display 8. In yet another embodiment, a single unit may include the functionality of the set top box 4, the functionality of the video control device 6 and the functionality of a personal video recorder. The present invention is applicable in these embodiments.

The viewer can control the system 1 through the remote control 16. As illustrated in FIGS. 1 and 7 by way of example, the remote control 16 communicates with the set top box 4 via a wireless link 18 conveying control signals using infrared (IR) light. Remote controls and their various functions are generally known in the art. In particular, it is known that IR light is modulated with a specific command, e.g., channel up or down, volume up or down, and the like, and that the controlled device detects and processes the modulated IR light to execute the command in the controlled device. Further, it is known that a remote control can control more than one device, e.g., a television set and the set top box 4.

Figure 8:
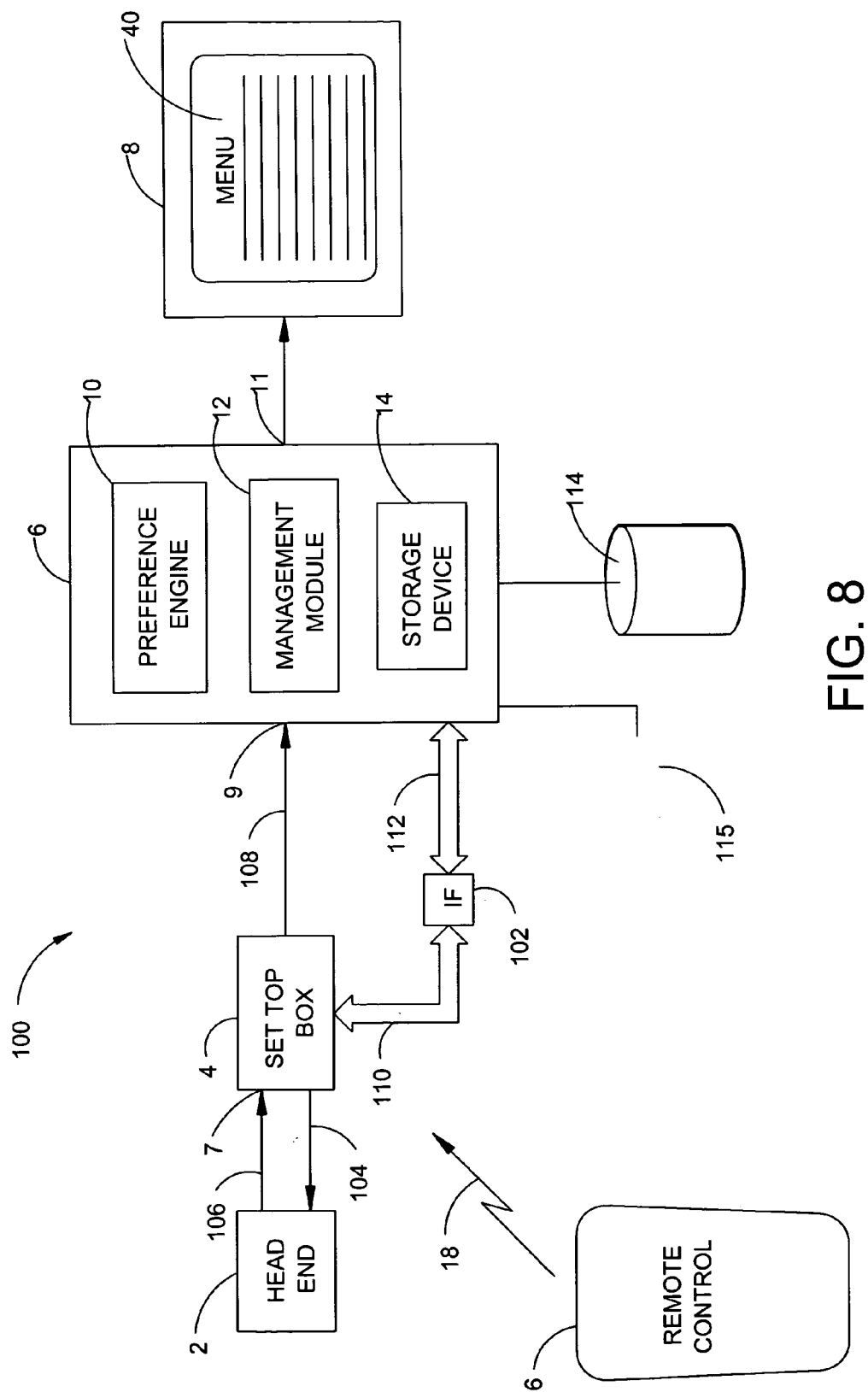
FIG. 8 is an illustration of a system for displaying video data in accordance with a further embodiment of the present invention that includes a set top box and a video control device connected to a display for displaying a menu of preferred display contents, wherein the video control device includes a preference engine, a management module and a storage device, wherein the video control device is coupled to an external storage device and an interface, and wherein the system is configured for bi-directional communications.

FIG. 8 is an illustration of a system 100 for displaying video data in accordance with another embodiment of the present invention. The system 100 has generally the same structure as the system 1, but further includes an external storage device 114 coupled to the video control device 6, an interface 102 (IF) for illustrative purposes coupled between the video control device 6 and the set top box 4, and a video camera 115 (camcorder) also coupled to the video control device 6. The video camera 115 is one example for a local source for video display content. In another embodiment, a computer network within a viewer's home or facilities may be a local source from which video display content is available.

It is contemplated that the video control device 6 includes appropriate interface circuitries to communicate with the external storage device 114 and the local sources, e.g., the video camera 115 or the computer network. The interface circuitries allow the video control device 6 to communicate with the local sources and to scan and read the available video display content. In one embodiment, the interface circuitries are the same as the interface 102. The video control device 6 may be configured to couple to additional or other external devices.

The broadcast head end 2 is coupled to the set top box 4 through a connection 106 and a connection 104 that allow bi-directional communications between the broadcast head end 2 and the set top box 4. It is contemplated that the connections 104, 106 may be combined as a single connection. The connection 106 conveys the broadcast video data and the electronic program guide to the set top box 4. The connection 104 provides for a back channel that allows the set top box 4 to send requests to the broadcast head end 2.

The set top box 4 is coupled to the video control device 6 through a connection 108 and through a connection formed by buses 110, 112 and the interface 102. The video control device 6 receives the broadcast display content as analog signals in accordance with known TV and video formats (e.g., NTSC). Those skilled in the art will appreciate that the video control device 6 may include circuitry, such as an MPEG-2 encoder, to compress the broadcast display content for storing on the storage devices 14, 114. The connection formed by the buses 110, 112 and the interface 102 convey digital signals between the set top box 4 and the video control device 6.

For illustrative purposes, FIG. 8 shows the interface (IF) 102 coupled to the set top box 4 and the video control device 6. However, it is contemplated that the functionality of the interface 102 may be included in one of the set top box 4 and the video control device 6, or in both. The interface 102 forwards the electronic program guide information to the video control device 6. In an embodiment in which the viewer uses the remote control 16 to control only the set top box 4, the interface 102 also forwards commands from the viewer to the video control device 6. Such commands include commands generated when the viewer selects and clicks the buttons 60-66 shown in the menu 40 of FIG. 3.

The interface 102 forwards requests from the video control device 6 to the set top box 4. For example, when the viewer selects a conditional access display content, e.g., pay-per-view video, the video control device 6 sends a corresponding request to the set top box 4, which then initiates a procedure to present the pay-per-view video to the viewer. Assuming that the pay-per-view video is already pre-recorded on one of the storage devices 14, 114, but is in a non-viewable mode, the set top box 4 authorizes the broadcast head end 2 to charge the viewer and requests a key. Once the key is received by the set top box 4, the pay-per-view video can be processed so that it is viewable. The non-viewable mode (i.e., the pay-per-view video is scrambled or encrypted) protects the content from unauthorized viewing (i.e., without paying).

The system 100 may be configured to allow the multiple-service operator to transmit conditional access content to the set top box 4 and the video control device 6 during a period of low traffic, for example, between midnight and 5 a.m. The set top box 4 and the video control device 6 accept this conditional access content and store it in the non-viewable mode. The conditional access content is then available to be considered by the preference engine 10 and to be added to the menu 40. Access to the scrambled content, however, is conditioned on the payment of a fee and availability of a key provided by the multiple-service operator.

In one embodiment, the interface 102 is compatible with the specification for a universal serial bus (USB), e.g., USB 2.0, or the IEEE 1394 standard, which is described in the "IEEE Std 1394-1995 IEEE Standard for a High Performance Serial Bus," Aug. 30, 1996, which is incorporated by reference herein. The interface 102 may include capabilities to encrypt the digital signals before they are recorded onto the storage devices 14, 114 to provide protection from unauthorized copying or transporting of stored video data by exchanging external rotating storage devices 114 between different video recording systems 100.

In one embodiment, the storage devices 14, 114 are hard disk drives that are compatible with the IEEE 1394 standard. Alternatively, the external storage drive 114 may be a writable digital video disk (DVD) drive, or another technology that provides for writable non-volatile storage. A full storage device 114 can be disconnected and replaced with an empty storage device 114. Thus, the video system 100 provides nearly unlimited storage capacity.

The management module 12 is configured to determine if and what kind of external devices are coupled to the video control device 6. For example, when the management module 12 determines that the video camera 115 is connected, the management module 12 scans the video camera 115 to obtain information about the audio/video files available from the video camera 115. Likewise, when the external storage device 114 is connected or replaced, the management module 12 scans the external storage device 114 to obtain information about the recorded display contents. The obtained information is then available to be added to the menu 40 and the To Do List 41.

What is claimed is:

1. A method of generating a menu representing a viewing sequence of display contents during a viewer's viewing session, comprising:
   recording first video data associated with a first plurality of display contents using a preference engine to select the display content;
   selectively recording second video data associated with a second plurality of display contents upon a viewer selecting the display content;
   defining a viewing session;
   defining a third plurality of display contents based upon available broadcast display contents during the viewing session and selected based upon the preference engine; and
   displaying a menu screen of viewing choices, wherein the menu screen comprises at least one of the first plurality of display contents, at least one of the second plurality of display contents and at least one of the third plurality of display contents.

2. The method of claim 1, wherein the viewing session has a duration of about four hours.

3. The method of claim 1, wherein the viewing session is defined as having a predetermined length upon activation of a video system.

4. The method of claim 1, further comprising receiving viewer input to select from the menu of viewing choices of one or more display contents for the viewing session to define a viewing sequence for display on a display.

5. The method of claim 1, further comprising automatically changing channels during the viewing session, wherein the channels provide the broadcast display contents.

6. The method of claim 4, further comprising analyzing the viewing sequence for conflicts caused by display contents that at least partially overlap.

7. The method of claim 6, further comprising allowing viewer intervention in case of unresolvable conflicts.

8. The method of claim 4, further comprising analyzing the viewing sequence for time gaps and filling the time gaps with display content using the preference engine to select the display content.

9. The method of claim 1, further comprising determining whether a local source for video display content is connected.

10. The method of claim 9, further comprising scanning the local source to obtain content information.

11. The method of claim 10, further comprising adding the content information as a fourth plurality to the menu of viewing choices.

12. A video system, comprising:
   an input port configured to receive display contents including a plurality of broadcast display contents;
   an output port configured to couple to a video display;
   a preference engine coupled to the input port, the preference engine configured to track viewer selections of the broadcast display contents and to create a viewer profile;
   a storage device coupled to the input port, the output port and the preference engine, the storage device configured to record first video data associated with a first plurality of display contents according to the viewer profile and to record second video data associated with a second plurality of display contents upon a viewer selecting the display content; and a management module coupled to the preference engine and the storage device, the management module configured to define a third plurality of display contents based upon the available broadcast display contents for a viewing session and based upon the viewer profile, to create a menu screen of viewing choices comprising at least one of the first plurality of display contents, at least one of the second plurality of display contents and at least one of the third plurality of display contents, the menu screen being displayable on the video display from which a viewer can select a sequence of display contents for the viewing session.

13. The video system of claim 12, further comprising a set-top box coupled to the input port and configured to receive display contents.

14. The video system of claim 13, wherein the preference engine, the management module and the storage device are included in a video control device providing for a functionality of a personal video recorder.

15. The video system of claim 12, further comprising a local source for display content in communication with the preference engine and the management module, wherein the management module is configured to scan the local source to obtain content information.

16. The video system of claim 12, wherein the management module is configured to initiate automatic channel changes.

* * * * *